United States Patent
Richter et al.

(10) Patent No.: US 8,966,108 B2
(45) Date of Patent: Feb. 24, 2015

(54) PORTABLE DATA CARRIER COMPRISING A CAT INTERPRETER

(75) Inventors: Oliver Richter, Munich (DE); Stephan Spitz, Munich (DE); Hao Chen, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 484 days.

(21) Appl. No.: 12/812,822

(22) PCT Filed: Jan. 15, 2009

(86) PCT No.: PCT/EP2009/000224
§ 371 (c)(1),
(2), (4) Date: Jul. 14, 2010

(87) PCT Pub. No.: WO2009/090070
PCT Pub. Date: Jul. 23, 2009

(65) Prior Publication Data
US 2011/0111802 A1    May 12, 2011

(30) Foreign Application Priority Data
Jan. 16, 2008   (DE) .......................... 10 2008 004 693

(51) Int. Cl.
*G06F 15/16*    (2006.01)
*H04W 4/00*    (2009.01)
(Continued)

(52) U.S. Cl.
CPC ............... *H04W 4/003* (2013.01); *H04L 67/02* (2013.01); *H04W 88/02* (2013.01)
USPC .......................................................... 709/232

(58) Field of Classification Search
None
See application file for complete search history.

(56) References Cited

U.S. PATENT DOCUMENTS

| 7,076,273 | B2 * | 7/2006 | Laumen et al. ............... 455/558 |
| 7,406,332 | B1 * | 7/2008 | Gaillard et al. ............... 455/558 |
| 7,417,885 | B2 | 8/2008 | Matsuno et al. |

(Continued)

FOREIGN PATENT DOCUMENTS

| CN | 1971758 A | 5/2007 |
| CN | 101006430 A | 7/2007 |

(Continued)

OTHER PUBLICATIONS

Guthery, S. et al: "The WebSIM—Clever Smartcards Listen to Port 80" Internet Citation, [Online] XP002461126, Dec. 1999.

(Continued)

*Primary Examiner* — Abdullahi Salad
(74) *Attorney, Agent, or Firm* — Workman Nydegger

(57) ABSTRACT

The invention relates to a method on a portable data carrier (10). In said method, a web server (62) of the data carrier (10) preferably receives command information from a terminal (100) connected to the data carrier (10), the command information relating to at least one CAT command ("Card Application Toolkit" command). The at least one CAT command is then executed by a CAT interpreter (64) of the data carrier (10). The command information is embedded in an HTTP command request message of an HTTP client (110) of the terminal (100), and the web server (62) extracts the embedded command information from the HTTP command request message before relaying it to the CAT interpreter (64) of the data carrier (10) for execution of the at least one CAT command. In this manner there is enabled a flexible and resource-saving interaction between the web server (62) and the CAT interpreter (64).

11 Claims, 3 Drawing Sheets

(51) Int. Cl.
*H04L 29/08* (2006.01)
*H04W 88/02* (2009.01)

(56) References Cited

U.S. PATENT DOCUMENTS

| | | | |
|---|---|---|---|
| 8,136,109 B1* | 3/2012 | Birdeau et al. | 717/175 |
| 8,676,260 B2* | 3/2014 | Robles et al. | 455/558 |
| 2004/0171375 A1* | 9/2004 | Chow-Toun | 455/418 |
| 2005/0259673 A1* | 11/2005 | Lu et al. | 370/419 |
| 2006/0150245 A1* | 7/2006 | Cheng et al. | 726/12 |
| 2007/0112680 A1* | 5/2007 | van Niekerk et al. | 705/57 |
| 2007/0121366 A1 | 5/2007 | Matsuno et al. | |
| 2007/0239857 A1* | 10/2007 | Mahalal et al. | 709/219 |
| 2007/0266271 A1 | 11/2007 | Frints | |
| 2008/0278496 A1* | 11/2008 | Helfman et al. | 345/441 |
| 2008/0280644 A1* | 11/2008 | Hugot | 455/556.2 |
| 2009/0020602 A1* | 1/2009 | Pratone | 235/380 |
| 2009/0082008 A1* | 3/2009 | Thorell | 455/423 |
| 2009/0191917 A1 | 7/2009 | Zappulla et al. | |
| 2010/0167754 A1* | 7/2010 | Jolivet | 455/456.1 |
| 2010/0281139 A1* | 11/2010 | Deprun | 709/219 |

FOREIGN PATENT DOCUMENTS

| | | |
|---|---|---|
| EP | 1 608 123 A1 | 12/2005 |
| EP | 1 691 536 A1 | 8/2006 |
| FR | 2 893 803 | 5/2007 |
| WO | 2004/059562 A2 | 7/2004 |
| WO | 2006/085201 A1 | 8/2006 |
| WO | 2007/062673 A1 | 6/2007 |
| WO | 2007/105084 A1 | 9/2007 |

OTHER PUBLICATIONS

International Search Report in PCT/EP2009/000224, Jul. 31, 2009.
Chinese Search Report from Corresponding Chinese Application No. 2009801068742, Jan. 30, 2013.

* cited by examiner

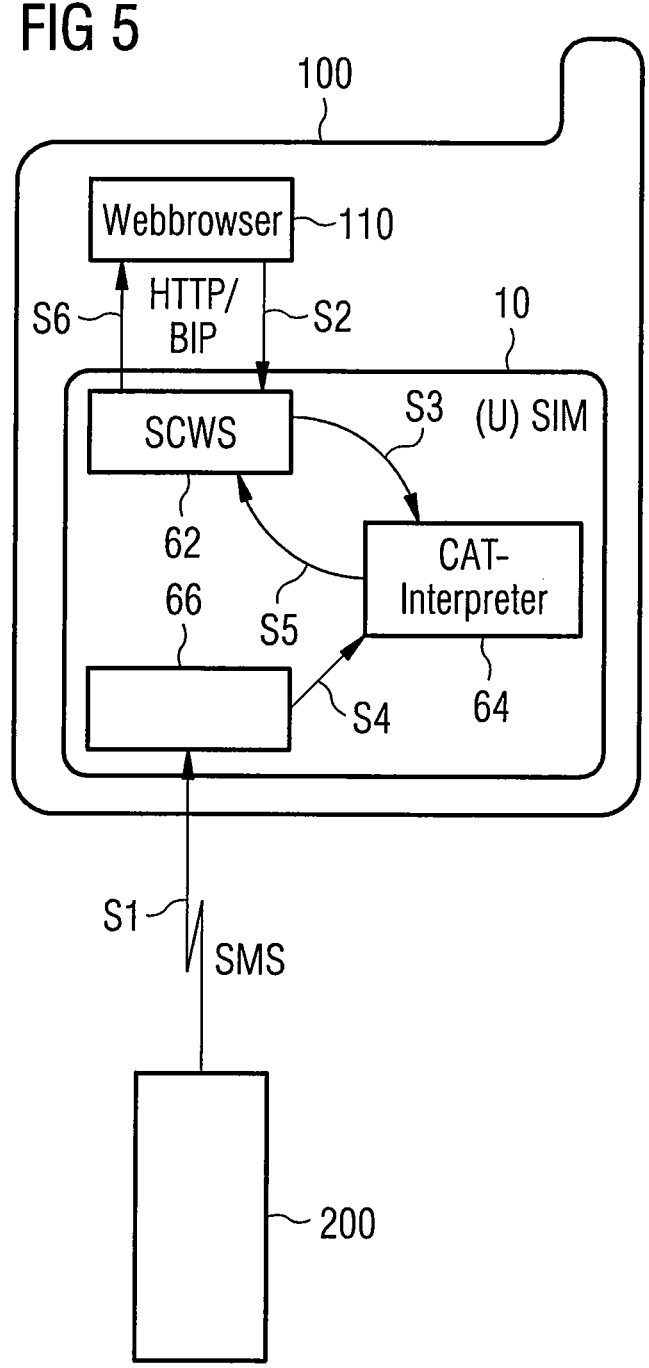

PORTABLE DATA CARRIER COMPRISING A CAT INTERPRETER

FIELD OF THE INVENTION

The present invention relates to a method for executing CAT commands on a portable data carrier, and to a corresponding data carrier.

BACKGROUND

CAT commands ("Card Application Toolkit" commands) are a collection of commands that extend the functionality of portable data carriers, in particular of (U)SIM mobile communication cards. The CAT commands are defined by ETSI, the European Telecommunications Standards Institute, in the specification TS102 223. These are commands of the (U)SIM mobile communication card to the telecommunication terminal, with which commands the telecommunication terminal and its components, e.g. the display, the keyboard and the like, can be directly addressed or queried. CAT commands furthermore also enable the sending of messages, e.g. SMS messages, or the setup of a voice connection through the (U)SIM mobile communication card. Such commands are also referred to as proactive commands, because they can be independently executed by the (U)SIM mobile communication card.

For executing a proactive command it is therefore necessary to reverse the conventional master/slave relationship between the telecommunication terminal and the (U)SIM mobile communication card. For commands of the "SIM Application Toolkit" implemented on usual (U)SIM mobile communication cards, said commands constituting a subset of those of the "Card Application Toolkit", the telecommunication terminal sends for example at regular intervals a request to the (U)SIM mobile communication card as to whether a SIM Application Toolkit command is present for processing. This procedure is referred to as "polling".

Modern (U)SIM mobile communication cards often have a web server application ("SCWS", Smart Card Web Server). The latter is adapted to provide to a web browser of the telecommunication terminal, on request, contents which are stored in the mobile communication card in the form of HTML documents. In this manner it is possible to present applications which are implemented completely on the mobile communication card, such as a phone book application, to a user of the telecommunication terminal in the form of HTML pages in the easy-to-use manner familiar to him from the Internet. Furthermore, the corresponding application can be easily transferred together with the mobile communication card to another telecommunication terminal as long as a web browser is available there.

Such applications, such as the above-mentioned phone book application, which partly make use of CAT commands must therefore support a mechanism which activates corresponding CAT commands on the mobile communication card when e.g. on the basis of an action of the user of the telecommunication terminal, for example the selection of a number from the phone book represented as an HTML document by clicking on said number, the corresponding CAT command for setting up a connection with the stated number is to be executed.

WO 2006/085201 A1 solves this problem by the phone book entry comprising a reference to a Java servlet stored on the mobile communication card and executable on a processor of the mobile communication card, wherein a click on the entry activates the servlet, which in its turn triggers the execution of the corresponding CAT command for dialing the number belonging to the phone book entry.

In WO 2007/105084 A1 there is described an application implemented as an applet, which makes SIM Toolkit commands and their interdependence displayable to a user of a telecommunication terminal. The application translates for this purpose the individual SIM Toolkit commands into corresponding HTML pages. The latter are displayed to the user and can be scrolled in accordance with the interdependencies of the SIM Toolkit commands by means of the navigation known from HTML pages. The statement of which of the commands displayed as described hereinabove is to be called is sent through an HTTP request to the application, which initiates an execution of the corresponding command.

For supporting an interaction between a web server application which makes available HTML contents on the (U)SIM mobile communication card, and a CAT interpreter for executing CAT commands on the (U)SIM mobile communication card, the prior art thus always makes use of an application usually implemented on the basis of the programming language Java. This requires a corresponding Java runtime environment on the (U)SIM mobile communication card, which makes substantial resource demands on the (U)SIM mobile communication card, and generally slows down the execution of the corresponding CAT commands.

SUMMARY

It is the object of the present invention to simplify an execution of CAT commands on a portable data carrier.

In the inventive method on a portable data carrier, a web server of the data carrier receives command information from a terminal connected to the data carrier, the command information relating to at least one CAT command. The at least one CAT command is then executed by a CAT interpreter of the data carrier. According to the invention, the command information is embedded in an HTTP command request message of an HTTP client of the terminal, and the web server extracts the embedded command information from the HTTP command request message before relaying it to the CAT interpreter of the data carrier for executing the at least one CAT command.

An inventive portable data carrier accordingly comprises a communication interface, a memory and a processor as well as a web server application and a CAT interpreter application. The web server application is adapted to receive command information relating to at least one CAT command from a terminal connectable to the data carrier via the communication interface, and the CAT interpreter application is adapted to execute the at least one CAT command. Further, the web server application is adapted to extract command information embedded in an HTTP command request message received from an HTTP client of the terminal from the HTTP command request message and to relay it to the CAT interpreter application.

In this manner it is possible to cause the execution of CAT commands, in particular out of HTML-based applications, without employing an execution application specifically programmed for such purposes, such as a Java servlet. The initiation of the execution of the CAT commands is effected through the HTTP command request message in flexibly controllable fashion and with very low resource utilization on the data carrier, because it requires no execution application additionally needing memory space and runtime. Accordingly, the inventive solution can also be realized on those data carriers that do not comprise a Java runtime environment or corresponding interpreter platforms.

Preferably, the data carrier is configured as a (U)SIM mobile communication card which is connected via the communication interface to a telecommunication terminal. The telecommunication terminal comprises a web browser which, as an HTTP client, sends the command information to the web server of the data carrier. A user of the telecommunication terminal is enabled by the method to use the (U)SIM Application Toolkit commands comfortably via the web browser of the telecommunication terminal.

For extraction of the command information from the received HTTP command request message, the web server application first identifies the command information within the HTTP command request message. According to one embodiment of the method, the web server application identifies as command information in the HTTP command request message at least one CAT command which is embedded e.g. in the message part of an HTTP command—e.g. of a "POST" command—as a text message. Thus transferred CAT commands are easy to identify for the web server application, e.g. by the special syntax of the CAT commands.

According to a further embodiment, there is embedded in the HTTP command request message a reference to a file which in turn comprises at least one CAT command. The web server application is adapted to identify such references and to extract them from the HTTP command request message.

The web server application can be adapted to receive from the CAT interpreter after the execution of the at least one CAT command, command response information which relates to the execution of the at least one CAT command. Such command response information can comprise e.g. status information, a result of a computation, a response text relating to a request, an error message or the like. The web server application is then further adapted to send an HTTP command response message comprising the command response information to the HTTP client of the terminal as a response to the HTTP command request message. In this manner it is possible to use the method for a completely HTML-based interaction of a user of the terminal with an application of the data carrier which employs CAT commands.

Such an application can support for example the procurement of certain information, e.g. of a specific stock-market price or the like, by means of an SMS request with a background system. In this case the command information relates to that CAT command initiating the sending of the SMS request. The SMS response of the background system is relayed by the CAT interpreter to the web server application as command response information. The web server application in turn embeds the SMS response in the HTTP command response message to the HTTP client of the terminal and sends the thus constructed HTTP command response message to the HTTP client of the terminal according to the HTTP communication protocol.

According to one embodiment, the command information embedded in the HTTP command request message can relate to a CAT command which upon the execution initiates the readout of a defined file. In said file there can be stored for example an SMS message previously received by the data carrier. The web server application receives from the CAT interpreter as command response information the content of the SMS message and embeds it in the HTTP command response message, as described hereinabove.

Preferably, the data communication between the data carrier and the terminal is effected on the transport layer (cf. ISO/OSI reference model), i.e. below the application layer on which, as described, the HTTP communication protocol is employed, according to the Bearer Independent Protocol (BIP) which is specified in ETSI TS102 223. The data carrier thus does not have to support a complete Internet protocol stack, but only a transmission protocol for the lower layers close to hardware, e.g. the T=0 protocol, as well as the BIP and the HTTP communication protocol. In this manner, too, it is possible to save resources of the data carrier or to enable rather low-resource data carriers to carry out the method.

BRIEF DESCRIPTION OF THE DRAWINGS

The invention will hereinafter be described by way of example with reference to the attached drawings. Therein are shown:

FIG. 5 components involved in a fourth embodiment and steps to be carried out therein.

DETAILED DESCRIPTION OF VARIOUS EMBODIMENTS

Figure 1:
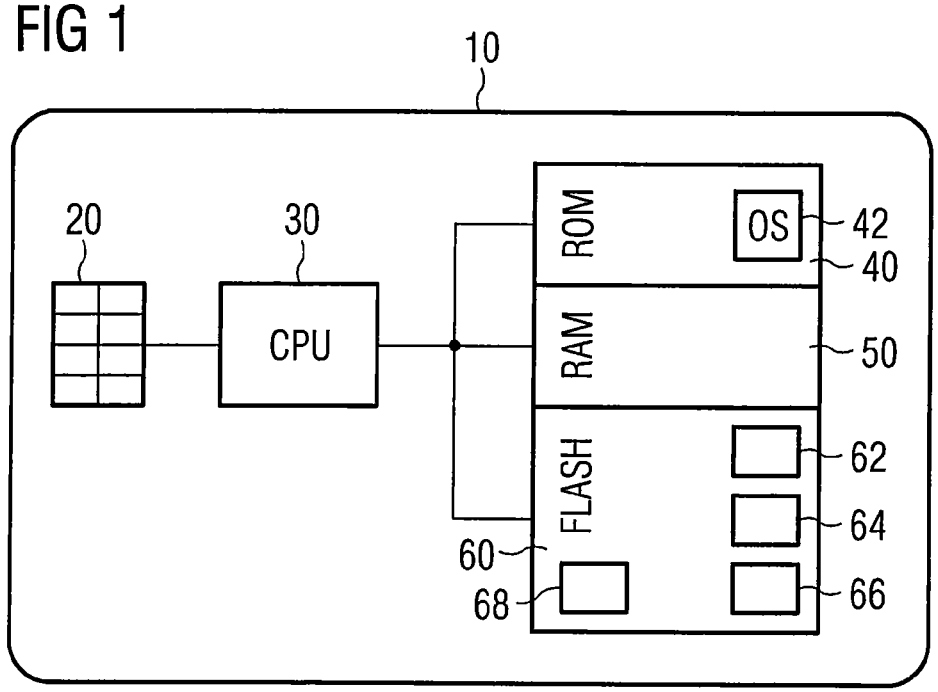
FIG. 1 a preferred embodiment of an inventive data carrier.

With reference to FIG. 1, the portable data carrier 10 configured here as a (U)SIM mobile communication card comprises a communication interface 20, a processor (CPU) 30 and various memories 40, 50 and 60.

The communication interface 20 is configured as a contact pad according to ISO/IEC 7816. This enables a data communication between the (U)SIM mobile communication card 10 and a terminal connected via the communication interface 20 to the (U)SIM mobile communication card 10, for example according to the T=0 or the USB communication protocol. However, the communication interface 20 can also be configured differently, for example according to the SD standard. Alternatively or additionally, the (U)SIM mobile communication card 10 can comprise a contactless interface, e.g. in the form of an antenna coil (not shown).

In the non-volatile, non-rewritable ROM memory 40 there is stored an operating system (OS) 42 controlling the (U)SIM mobile communication card 10. Special operating system routines implement the communication protocols supported by the (U)SIM mobile communication card 10. These are in particular the T=0 or T=1 protocol on the network access layer close to hardware, the Bearer Independent Protocol (BIP) on the connection and transport layer, and the HTTP communication protocol on the application layer. It is also possible that the (U)SIM mobile communication card 10 supports alternative or additional communication protocols, such as the USB protocol, or comprises a complete Internet protocol stack. A volatile, rewritable RAM memory 50 serves the (U)SIM mobile communication card 10 as working memory, and a non-volatile, rewritable FLASH memory 60 serves to store applications and data, such as a web server application 62 and a CAT interpreter application 64, as well as files 66 and 68.

The web server application 62 is adapted to provide contents, e.g. in the form of HTML documents, on request to an HTTP client, e.g. a web browser 110 (FIGS. 2 to 5) of a telecommunication terminal 100 connected to the (U)SIM mobile communication card 10 via the communication interface 20 (FIGS. 2 to 5), and to receive data from the HTTP client, whereby a corresponding data communication on the application layer is normally carried out according to the HTTP communication protocol. The CAT interpreter application 64 is adapted to execute CAT commands. The two applications as well as the data sets in the files 66 and 68 will hereinafter be described more closely with reference to FIGS. 2 to 5.

Figure 2:
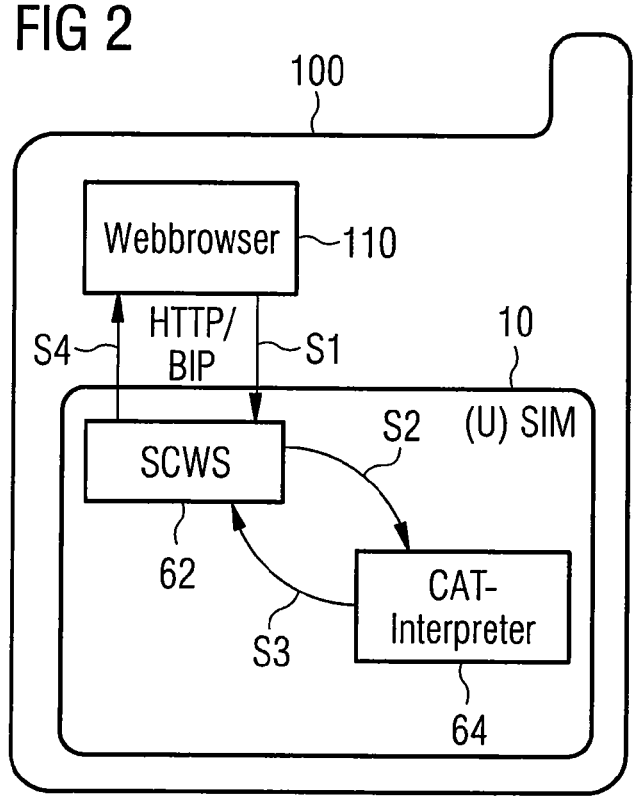
FIG. 2 components involved in a first embodiment of the inventive method and steps to be carried out therein.

In FIG. 2 there is schematically represented a first embodiment of a method for executing a CAT command through a CAT interpreter 64 on the (U)SIM mobile communication card 10. The (U)SIM mobile communication card 10 is connected via the communication interface 20 to the telecommunication terminal 100 on which a web browser 110 is executed. On the (U)SIM mobile communication card 10 there is implemented for example a phone book application which allows a user of the telecommunication terminal 100 to search by means of the web browser 110 a phone book rendered as an HTML document and to directly dial desired numbers by clicking on the same. Different applications are likewise possible.

As the result of such a click on a phone book entry, the web browser 110, in a first step S1, sends an HTTP command request message to the web server application (SCWS) 62, which comprises as command information in the content field of a corresponding HTTP command, e.g. of a "POST" command, a CAT command as text information, e.g. in the form <SET UP CALL 123456>. The web server application 62 analyzes the received command, e.g. by means of a suitable parser, and identifies the CAT command embedded in the HTTP command request message, which command the web server application 62 thereupon extracts from the HTTP command request message, and relays to the CAT interpreter application 64 in a second step S2. It is likewise possible to embed several CAT commands in the HTTP command request message as command information.

The CAT interpreter application 64 is adapted to execute the received CAT command, i.e. to set up a voice connection to the stated number 123456. After the CAT interpreter application 64 has executed the command, it sends, in step S3, command response information to the web server application 62 saying that the corresponding command has been executed, i.e. that a dialing of the corresponding number has been effected. As command response information the CAT interpreter application 64 can for example also return an error message when an execution of the corresponding command has failed. Further forms of command response information will be described with reference to FIGS. 4 and 5.

The web server application 62 receives the command response information sent by the CAT interpreter application 64 and embeds it in an HTTP command response message, which it sends to the web browser 110 as a response to the HTTP command request message in step S4. The user of the telecommunication terminal 100 can then read on the web browser 110 for example that the desired number has been dialed. Alternatively, the steps S3 and S4 can be omitted, i.e. there is no direct feedback from the CAT interpreter application 64 to the web browser 110 via the web server application 62. It is also possible that the web server application 62 sends an HTTP command response message to the web browser 110 without having received command response information from the CAT interpreter application 64. Such an HTTP command response message can convey for example the information that the CAT command received with the HTTP command request message has been relayed to the CAT interpreter application 64.

Figure 3:
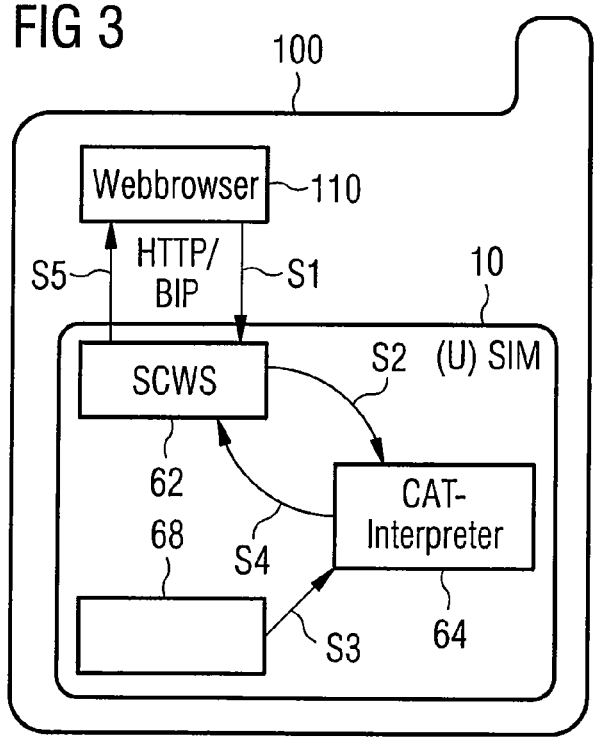
FIG. 3 components involved in a second embodiment and corresponding steps.

FIG. 3 represents schematically a second embodiment of the method. By means of said second embodiment it is possible to achieve precisely the same effect as with the method described with reference to FIG. 2. Only the manner in which the command information relating to the CAT command to be executed is relayed to the CAT interpreter application 64 distinguishes the method represented here from that in FIG. 2. The HTTP command request message sent from the web browser 110 to the web server application 62 in step S1 now contains, instead of an explicit CAT command, a reference to the file 68 in which the CAT command is stored. The web server application 62 identifies this specific reference, extracts it from the HTTP command request message and relays the reference in step S2 to the CAT interpreter application 64, which in turn is adapted to read out the command from the command file 68 in step S3 and execute it.

This embodiment of the method is suited in particular for initiating by means of an HTTP command request message the execution of a plurality of CAT commands which are stored in an accordingly defined command file, without having to embed each of said commands in the HTTP command request message again explicitly and upon each identical, possibly recurring HTTP command request message. For example, a sending of SMS messages to a predetermined distribution list can be carried out efficiently in this manner. The steps S4 and S5 correspond to the steps S3 and S4 from FIG. 2 and will not be described again.

Figure 4:
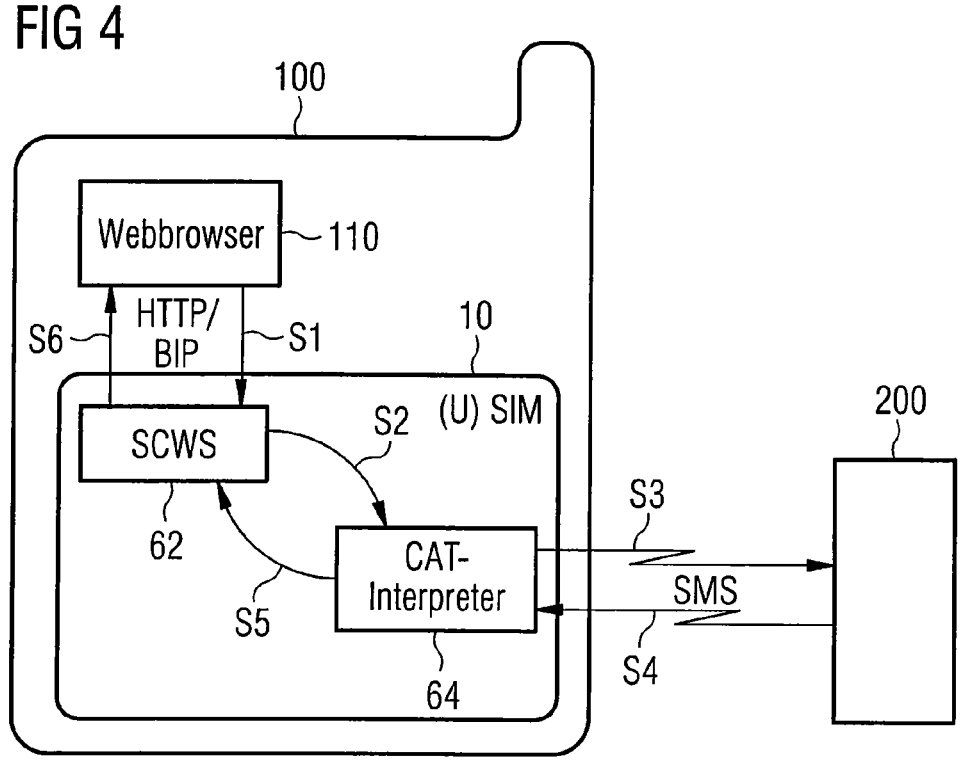
FIG. 4 components involved in a third embodiment and steps to be carried out therein.

A further embodiment of the method which is represented with reference to FIG. 4 resembles the method from FIG. 2 in the basic procedure. In step S1 the web browser sends the HTTP command request message to the web server application 62, as described hereinabove. The latter identifies and extracts the CAT command embedded therein and relays it to the CAT interpreter application 64. In the embodiment from FIG. 4, the CAT command triggers the sending of an SMS request message to a background system 200 in step S3. By means of such an SMS request message the user of the telecommunication terminal 100 can for example make use of information services and request specific information, such as stock-exchange prices, sports results, meteorological information and the like.

The background system 200, in step S4, sends to the (U)SIM mobile communication card 10 an SMS response message following the SMS request message. Said SMS response message and possibly already the SMS request message can be transferred between the background system and the (U)SIM mobile communication card 10 according to GSM 03.48 in encrypted form. In this manner it is also possible to carry out the transfer of sensitive data by means of the method described here.

The SMS response message which contains the information requested by the user is relayed by the CAT interpreter application 64 to the web server application 62 as command response information in step S5.

The web server application 62 embeds the thus received SMS response message in an HTTP command response message and sends the latter to the web browser 110 of the telecommunication terminal 100 in step S6. The user of the telecommunication terminal 100 can thereupon view the content of the SMS response message as an HTML document on the web browser 110.

In FIG. 5 a further embodiment of the method is illustrated. In contrast to the method described in FIG. 4, the web browser 110, in step S2, sends to the web server application 62 by means of the HTTP command request message a CAT command which, after an extraction and relaying to the CAT interpreter application 64, causes the latter to read out an SMS message stored in a file 66. Said SMS message has been received by the (U)SIM mobile communication card 10 in a preceding step S1 and stored in the file 66. The content of the read-out SMS message is sent as command information by the CAT interpreter application 64 in step S5 to the web server application 62, which operates in step S6 analogously to the embodiment from FIG. 4.

In a special embodiment of this embodiment, the steps S2 and S3 can be omitted when the (U)SIM mobile communication card 10 receives a so-called push SMS message. A push SMS message is normally processed by the (U)SIM mobile communication card and displayed to the user directly. The CAT interpreter application 64 initiates the launching of the web browser 110 of the telecommunication terminal 100 by means of a special CAT command, "LAUNCH BROWSER", and only then relays the content of the received push SMS message to the web server application 62. The latter deals therewith as in the embodiments described with reference to FIGS. 4 and 5, whereupon the push SMS message is displayed on the web browser 110 as a visually appealing HTML document to the user of the telecommunication terminal 100 directly and without any request on his part.

As represented in FIGS. 2 to 5, the data transfer between the (U)SIM mobile communication card 10 and the telecommunication terminal 100 is carried out on the transport layer according to the Bearer Independent Protocol (BIP). The (U)SIM mobile communication card 10 normally does not comprise a complete Internet protocol stack or a Java runtime environment. The web server application 62 provides to the web browser 110, besides static contents which are stored in the memory 60, only those contents comprising dynamically generated contents due to the executed CAT commands. Accordingly, the hereinabove described methods can also be carried out by means of limited-resource data carriers or with minimal resource utilization.

The invention claimed is:

1. A method for executing Card Application Toolkit (CAT) commands on a portable data carrier, comprising the steps of:
    receiving command information relating to at least one CAT command from a terminal through a web server of the portable data carrier;
    executing the at least one CAT command through a CAT interpreter of the data carrier, wherein the command information is embedded in an HTTP command request message of an HTTP client of the terminal; and
    through the web server of the portable data carrier, carrying out the steps of:
    identifying the received command information in the HTTP command request message;
    identifying as command information in the HTTP command request message at least one CAT command or a reference to a file containing at least one CAT command and stored on the data carrier;
    extracting the received command information from the HTTP command request message; and
    relaying the command information to the CAT interpreter of the data carrier for execution of the at least one CAT command, wherein
    the data communication between the data carrier and the terminal is carried out on the transport layer according to the Bearer Independent Protocol (BIP),
    the portable data carrier does not comprise a Java runtime environment, and
    the data carrier does not have to support a complete Internet protocol stack.

2. The method according to claim 1, wherein the command information is received in a format suitable for the CAT interpreter, and the received command information is relayed to the CAT interpreter unchanged after extraction.

3. The method according to claim 1, including the steps:
    receiving command response information from the CAT interpreter through the web server, said information comprising response information relating to the execution of the at least one CAT command; and
    sending an HTTP command response message through the web server to the HTTP client of the terminal, said message comprising the response information.

4. The method according to claim 3, wherein, through the execution of the at least one CAT command, initiating the sending of an SMS request message through the data carrier to a background system, and imbedding in the HTTP command response message via the web server, as command response information of the CAT interpreter, an SMS response message received by the data carrier from the background system following the SMS request message.

5. The method according to claim 3, wherein, through the execution of the at least one CAT command, initiating the readout of a file present on the data carrier and storing an SMS message received by the data carrier, and imbedding via the web server the read-out SMS message in the HTTP command response message as the command response information of the CAT interpreter.

6. The method according to claim 1, wherein the data carrier is connected as a (U)SIM mobile communication card to a telecommunication terminal, and the web server of the data carrier receives the HTTP command request message from a web browser of the telecommunication terminal.

7. A portable data carrier, comprising:
    a communication interface,
    a memory,
    a processor,
    a web server application, and
    a CAT interpreter application,
    wherein the web server application is configured to receive command information relating to at least one CAT command from a terminal connectable to the data carrier via the communication interface, and the CAT interpreter application is configured to execute the at least one CAT command,
    wherein the web server application is configured to extract command information embedded in an HTTP command request message received from an HTTP client of the terminal and to relay it to the CAT interpreter application, wherein
    the data communication between the data carrier and the terminal is carried out on the transport layer according to the Bearer Independent Protocol (BIP),
    the portable data carrier does not comprise a Java runtime environment, and
    the data carrier does not have to support a complete Internet protocol stack.

8. The data carrier according to claim 7, wherein the web server application is configured to identify the command information in the HTTP command request message.

9. The data carrier according to claim 8, wherein the data carrier is configured to carry out a method including the steps of
    receiving command information relating to the at least one CAT command from the terminal through the web server of the portable data carrier;
    executing the at least one CAT command through the CAT interpreter of the data carrier, wherein the command information is embedded in the HTTP command request message of the HTTP client of the terminal; and
    through the web server of the portable data carrier, carrying out the steps of:

identifying the received command information in the HTTP command request message;

identifying as command information in the HTTP command request message at least one CAT command or a reference to a file containing at least one CAT command and stored on the data carrier;

extracting the received command information from the HTTP command request message; and relaying the command information to the CAT interpreter of the data carrier for execution of the at least one CAT command.

10. The data carrier according to claim 7, wherein the data carrier is configured as a (U)SIM mobile communication card which is connectable via the communication interface to a telecommunication terminal.

11. A method for executing Card Application Toolkit (CAT) commands on a portable data carrier, comprising the steps of:

receiving command information relating to at least one CAT command from a terminal through a web server of the portable data carrier;

executing the at least one CAT command through a CAT interpreter of the data carrier, wherein the command information is embedded in an HTTP command request message of an HTTP client of the terminal; and through the web server of the portable data carrier, carrying out the steps of:

identifying the received command information in the HTTP command request message;

identifying as command information in the HTTP command request message at least one CAT command or a reference to a file containing at least one CAT command and stored on the data carrier;

extracting the received command information from the HTTP command request message; and relaying the command information to the CAT interpreter of the data carrier for execution of the at least one CAT command, wherein the data communication between the data carrier and the terminal is carried out on the transport layer according to the Bearer Independent Protocol (BIP), the portable data carrier does not use a Java runtime environment, and the data carrier does not have to support a complete Internet protocol stack.

* * * * *